US008408518B2

(12) United States Patent
Schade et al.

(10) Patent No.: US 8,408,518 B2
(45) Date of Patent: Apr. 2, 2013

(54) ELECTRIC ACTUATORS HAVING INTERNAL LOAD APPARATUS

(75) Inventors: Ross Arthur Schade, Ames, IA (US); Thomas Pesek, Ankeny, IA (US); John Stanley Bandas, Evansville, IN (US)

(73) Assignee: Fisher Controls International, LLC, Marshalltown, IA (US)

(*) Notice: Subject to any disclaimer, the term of this patent is extended or adjusted under 35 U.S.C. 154(b) by 642 days.

(21) Appl. No.: 12/618,467

(22) Filed: Nov. 13, 2009

(65) Prior Publication Data

US 2011/0115319 A1 May 19, 2011

(51) Int. Cl.
*F16K 31/02* (2006.01)
(52) U.S. Cl. .................. 251/129.12; 251/83; 251/249.5; 74/424.71
(58) Field of Classification Search .............. 251/82, 251/83, 129.12, 249.5; 73/168; 74/424.71
See application file for complete search history.

(56) References Cited

U.S. PATENT DOCUMENTS

| | | | | |
|---|---|---|---|---|
| 3,258,985 A | * | 7/1966 | Jordan | 477/13 |
| 3,524,526 A | * | 8/1970 | Denkowski | 192/141 |
| 3,616,884 A | * | 11/1971 | Balz | 192/51 |
| 4,364,541 A | * | 12/1982 | Chabat-Courrede et al. | 251/54 |
| 4,794,309 A | | 12/1988 | Saito et al. | |
| 5,518,462 A | | 5/1996 | Yach | |
| 5,564,677 A | * | 10/1996 | Levy et al. | 251/129.12 |
| 5,594,175 A | * | 1/1997 | Lyon et al. | 73/593 |
| 5,761,963 A | * | 6/1998 | Hartwig | 74/89.37 |
| 5,836,567 A | * | 11/1998 | Watanabe | 251/129.12 |
| 5,950,668 A | | 9/1999 | Baumann | |
| 6,371,162 B1 | | 4/2002 | Groeneveld | |
| 6,471,182 B1 | | 10/2002 | McIntosh | |
| 6,488,260 B1 | | 12/2002 | Dietz | |
| 6,769,665 B2 | | 8/2004 | Silva et al. | |
| 6,997,430 B2 | | 2/2006 | Denning et al. | |
| 7,694,939 B2 | * | 4/2010 | Okitsu | 251/264 |

(Continued)

FOREIGN PATENT DOCUMENTS

DE 8530979 2/1994
WO 2008119189 10/2008

OTHER PUBLICATIONS

International Searching Authority, "International Search Report," issued in connection with international application serial No. PCT/US2010/053851, mailed Apr. 5, 2011, 5 pages.

(Continued)

*Primary Examiner* — John Rivell
*Assistant Examiner* — Matthew W Jellett
(74) *Attorney, Agent, or Firm* — Hanley, Flight & Zimmerman, LLC

(57) ABSTRACT

Electric actuators having internal load apparatus are described herein. An example electric actuator having an internal load apparatus described herein includes a housing defining a cavity to receive a drive system and a drive shaft operatively coupled to the drive system. Rotation of the drive system in a first rotational direction causes the drive shaft to move in a first rectilinear direction and rotation of the drive system in a second rotational direction causes the drive shaft to move in a second rectilinear direction opposite the first rectilinear direction. A biasing element is operatively coupled to the drive system such that least a portion of the drive system moves axially toward the biasing element to deflect the biasing element when the drive shaft reaches an end of stroke position to provide a load to the drive shaft when electric power to the electric actuator is removed.

24 Claims, 9 Drawing Sheets

U.S. PATENT DOCUMENTS

2004/0134665 A1   7/2004   Greeb et al.
2007/0017577 A1   1/2007   Kouzu et al.
2008/0245881 A1   10/2008  Peric

OTHER PUBLICATIONS

International Searching Authority, "Written Opinion of the International Searching Authority," issued in connection with international application serial No. PCT/US2010/053851, mailed Apr. 5, 2011, 7 pages.

Beck, "Electric Actuators for Industrial Process Control," Feb. 2005, 8 pages.

Emerson Process Management, "Baumann Electronic Modulating Actuators," Product Bulletin, May 2009, 8 pages.

Emerson Process Management, "Baumann NV Electric Actuator Instructions," Instruction Manual, May 2009, 12 pages.

Woodward, "GVP-100 Gas Control Valve," 2004, 16 pages.

International Bureau, "Interntational Preliminary Report on Patentability," issued in connection with international application serial No. PCT/US2010/053851, mailed May 24, 2012, 9 pages.

* cited by examiner

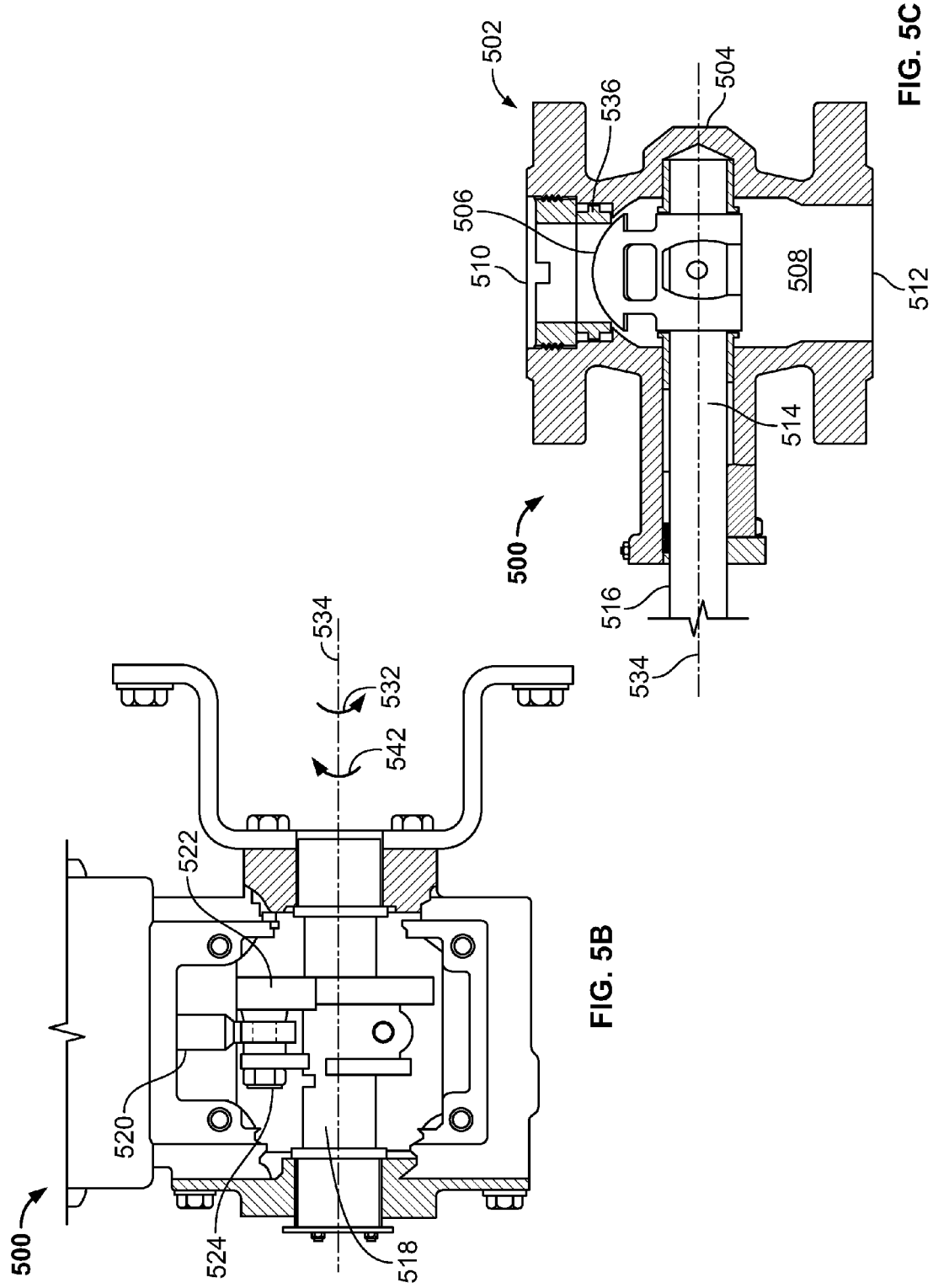

ELECTRIC ACTUATORS HAVING INTERNAL LOAD APPARATUS

FIELD OF THE DISCLOSURE

The present disclosure relates generally to electric actuators and, more particularly, to electric actuators having internal load apparatus.

BACKGROUND

Control valves (e.g., sliding stem valves) are commonly used in process control systems to control the flow of process fluids. A control valve typically includes an actuator (e.g., an electric actuator, a hydraulic actuator, etc.) that automates operation of the control valve. Sliding stem valves such as gate, globe, diaphragm, pinch, and angle valves typically have a valve stem (e.g., a sliding stem) that drives a fluid flow control member (e.g., a valve plug) between an open position and a closed position.

Electric actuators often employ a motor operatively coupled to a flow control member via a drive system (e.g., one or more gears). During operation, when electric power is supplied to the motor, the electric actuator moves the flow control member between a closed position and an open position to regulate fluid flowing through a valve. When the valve is closed, the flow control member is typically configured to sealingly engage an annular or circumferential seal (e.g., a valve seat) disposed within the flow path to prevent the flow of fluid between an inlet and an outlet of the valve.

When the valve is in the closed position and electric power is provided to the motor, the motor typically provides sufficient seat load to the fluid flow control member to ensure that the fluid flow control member is in sealing engagement with a valve seat of the valve. When electric power is removed from the motor, the drive system (e.g., worm gears) may maintain the position of the fluid flow control member relative to the valve seat and prevent substantial movement of the fluid flow control member in a reverse or opposite direction (e.g., away from the valve seat). However, the drive system may not provide an adequate or sufficient seat load to the fluid flow control member to ensure the fluid flow control member is in sealing engagement with the valve seat. As a result, fluid may leak through the valve between the inlet and the outlet of the valve.

SUMMARY

In one example, an electric actuator includes a housing defining a cavity to receive a drive system and a drive shaft operatively coupled to the drive system. Rotation of the drive system in a first rotational direction causes the drive shaft to move in a first rectilinear direction and rotation of the drive system in a second rotational direction causes the drive shaft to move in a second rectilinear direction opposite the first rectilinear direction. A biasing element is operatively coupled to the drive system such that least a portion of the drive system moves axially toward the biasing element to deflect the biasing element when the drive shaft reaches an end of stroke position to provide a load to the drive shaft when electric power to the electric actuator is removed.

In another example, a load apparatus for use with an electric actuator includes a drive gear operatively coupled to a drive system of the electric actuator. The drive gear rotates in a first direction and a second direction and the drive gear moves between a first rectilinear position and a second rectilinear position. A drive shaft is operatively coupled to the drive gear such that the drive gear causes the drive shaft to move in a first rectilinear direction when the drive gear rotates in the first direction and the drive gear causes the drive shaft to move in a second rectilinear direction when the drive gear rotates in the second direction. A biasing element is disposed between the drive gear and a seating surface such that when the drive gear rotates in the first direction and the drive shaft reaches an end of stroke position in the first rectilinear direction, the drive gear continues to rotate about the drive shaft in the first direction and moves axially relative to the drive shaft from the first rectilinear position to the second rectilinear position to deflect the biasing element.

In yet another example, a load apparatus for use with an electric actuator includes means for converting rotational motion of a drive system to rectilinear motion of a drive shaft. The load apparatus also includes means for providing a seat load to a fluid flow control member of a fluid valve coupled to the drive shaft when the flow control member is in sealing engagement with a valve seat of the fluid valve and electric power to a motor is removed. The load apparatus further includes means for deflecting that is to move at least a portion of the means for converting rotational motion axially relative to the drive shaft toward the means for providing a seat load.

BRIEF DESCRIPTION OF THE DRAWINGS

FIGS. 5A-5C illustrate another example control valve assembly implemented with the example actuator of FIGS. 1A, 1B, 2, 3A, and 3B.

DETAILED DESCRIPTION

In general, the example electric actuators described herein provide a seat load to a fluid valve when electric power to a drive motor of the actuators is removed. The example electric actuators described herein provide a seat load without consuming electric power. More specifically, the example electric actuators may include a biasing element disposed within a housing or casing of the actuator to provide a seat load to a fluid flow control member of a valve when the fluid flow control member is in sealing engagement with a valve seat and the electric actuator (e.g., an electric motor) is not receiving electric power. For example, the biasing element may be implemented as one or more springs that exert a force to provide a seat load to a fluid flow control member (e.g., a valve plug) operatively coupled to the electric actuator when the fluid flow control member is sealingly engaged with the valve seat (e.g., a closed position) and a power supply source fails to provide power to a motor of the electric actuator.

In contrast, some known electric actuators use a complex combination of biasing elements, clutches and brake systems that provide a sufficient seat load when the electric actuator is in a fail-safe condition. In other words, known electric actuators may include a biasing element to move a flow control member of a valve to a closed position during, for example, a power failure. Thus, if the fluid valve is in the open position when a power failure occurs, the biasing element moves the fluid flow control member to the closed position. However, these known actuators often include complex assemblies. Additionally, some of these known actuation systems having fail-safe apparatus typically include a declutchable gear box to enable operation of the fail-safe apparatus. In other words, a drive assembly must typically be operatively decoupled from, for example, a gear transmission to enable operation of the fail-safe apparatus. However, declutchable gearboxes are relatively expensive, difficult to operate, enlarge the dimensional envelope of a valve and actuator assembly, and involve complex assemblies within the actuator. Additionally, such fail-safe apparatus may not be required and/or desired for some applications, thereby unnecessarily increasing the costs of a control valve assembly.

Figure 1A:
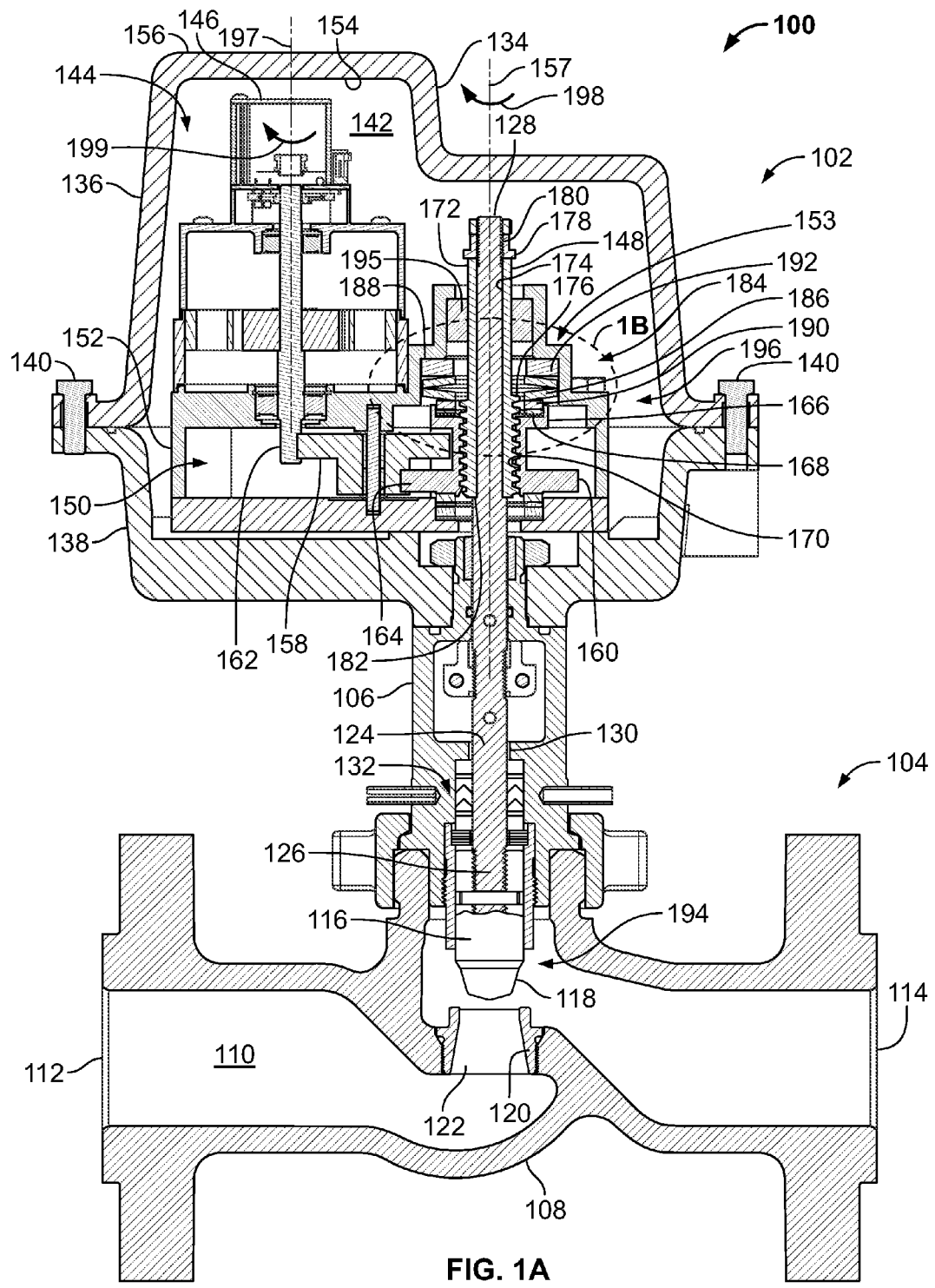
FIG. 1A illustrates an example control valve assembly described herein shown in an open position.

FIG. 1A illustrates an example control valve assembly 100 described herein. The control valve assembly 100 includes an electric actuator 102 operatively coupled to a fluid valve 104 via a bonnet 106. The fluid valve 104 includes a valve body 108 that defines a fluid flow passageway 110 between an inlet 112 and an outlet 114. A fluid flow control member 116 (e.g., a valve plug) is disposed within the fluid flow passageway 110 and includes a seating surface 118 that sealingly engages with a valve seat 120 to control fluid flow through a port area or orifice 122 between the inlet 112 and the outlet 114. A valve stem 124 is coupled (e.g., threadably coupled) to the fluid flow control member 116 at a first end 126 and is operatively coupled to the electric actuator 102 at a second end 128. The bonnet 106 is coupled to the valve body 108 and includes a bore 130 to slidably receive the valve stem 124. The bonnet 106 houses a valve packing assembly 132 that provides a seal to oppose the pressure of the process fluid flowing through the fluid valve 104 to prevent leakage of process fluid past the valve stem 124 and/or protect the environment against the emission of hazardous or polluting fluids.

The actuator 102 includes a housing 134 having a first casing 136 coupled to a second casing 138 via fasteners 140. The first and second casings 136 and 138 of the housing 134 define a cavity 142 to receive a drive system 144. In this example, the drive system 144 includes a motor 146 operatively coupled to an output shaft or drive shaft 148 via a transmission 150. The transmission 150 converts rotational motion of the motor 146 to rectilinear motion of the drive shaft 148.

The transmission 150 may be configured to amplify the torque generated by the motor 146 and transmit the amplified torque to the drive shaft 148. The amplified torque transmitted to the drive shaft 148 enables the flow control member 116 to engage the valve seat 120 with a greater force and, thus, provide a tighter sealing engagement with the valve seat 120 to prevent the flow of fluid through the valve body 108 when the flow control member 116 is sealingly engaged with the valve seat 120 and electric power is provided to the motor 146. Also, a relatively smaller sized motor 146 may be used to drive the flow control member 116 with a transmission configured to amplify the torque generated by the motor 146. For example, the amount of torque amplification provided by the transmission 150 can vary based on the size (e.g., the diameter, number of gear teeth, etc.) of a gear. In yet other examples, the motor 146 may be directly coupled to the drive shaft 148. In such a direct-drive configuration, the motor 146 directly drives the drive shaft 148 without any other interposing mechanism or device such as, for example, the transmission 150 or the like.

As shown, the transmission 150 includes a gear transmission or gearbox 152 disposed within the cavity 142 of the housing 134. The motor 146 is disposed within the cavity 142 of the electric actuator 102 and is coupled to the gearbox 152 (e.g., to a housing of the gearbox 152) via, for example, a fastener and/or any other suitable fastening mechanism(s). However, in other examples, the motor 146 may be coupled to the housing 134 of the actuator 102 via fasteners or any other suitable fastening mechanism(s). In some examples, the motor 146 may be coupled to an interior surface 154 of the housing 134 or to an exterior surface 156 of the housing 134. The motor 146 may be any motor such as, for example, an alternating current (AC) motor, a direct current (DC) motor, a variable frequency motor, a stepper motor, a servo motor, or any other suitable motor or drive member. Also, the gearbox 152 may include a plurality of gears (e.g. spur gears), a planetary gear system, or any other suitable gear or transmission to convert rotational motion of the motor 146 to rectilinear motion of the drive shaft 148. As described in greater detail below, at least one gear of the transmission 150 translates or moves axially along an axis 157 between a first position and a second position.

In the illustrated example, the transmission 150 includes an intermediate gear 158 and a drive gear 160. The intermediate gear 158 operatively couples an output shaft 162 of the motor 146 and the drive gear 160. As shown, the drive gear 160 includes a gear engaging portion 164 and a second portion 166 (e.g., integrally formed with the gear engaging portion 164) having a recessed opening 168. The gear engaging portion 164 includes gear teeth to mesh with or engage gear teeth of the intermediate gear 158. Also, the drive gear 160 includes a threaded aperture or opening 170 to threadably receive the drive shaft 148.

As shown, the drive shaft 148 is a screw. More specifically, the drive shaft 148 comprises a cylindrically-shaped body 172 having an aperture or opening 174 and an externally threaded portion 176. The opening 174 of the drive shaft 148 receives the second end 128 of the valve stem 124. A flanged nut 178 threadably couples to a threaded end 180 of the valve stem 124 to capture or retain the drive shaft 148 between a shoulder 182 of the valve stem 124 and the flanged nut 178. The externally threaded portion 176 of the drive shaft 148 is threadingly coupled to the threaded aperture 170 of the drive gear 160. Although not shown, in other examples, the drive shaft 148 may be a gear system, a ball screw system, a lead-screw system, and/or any other suitable transmission system to convert rotational motion of the motor 146 to rectilinear motion of the valve stem 124.

A load apparatus or assembly 184 is disposed within the gearbox 152 (e.g., within a housing of the gearbox 152) to provide a seat load to the flow control member 116 when the flow control member 116 is in a closed position and electric power to the actuator 102 is removed. The load apparatus 184 includes a biasing element 186 disposed between the second portion 166 of the drive gear 160 and a spring seat or surface 188 of the gearbox 152. The load apparatus 184 may also include a thrust bearing 190 disposed between the drive gear 160 and the biasing element 186. The thrust bearing 190 transmits a load exerted by the biasing element 186 to the drive gear 160 when the biasing element 186 is deflected and may be received by the recessed opening 168 of the drive gear 160. In this example, the biasing element 186 includes a stack of Belleville springs. The load apparatus 184 may include a spacer 192 disposed between the biasing element 186 and the surface 188 of the gearbox 152 to adjust the height of the stack of Belleville springs. In general, a Belleville spring provides a high loading relative to the travel or deflection imparted on the Belleville spring. Thus, as a result, the example load apparatus 184 may be configured to have a relatively small footprint, thereby reducing the overall envelope or footprint of the control valve assembly 100. In other examples, the biasing element 186 may be a coil spring, spring washers, a wave spring, a spring bellow, and/or any other suitable biasing element(s). In yet other examples, the biasing element may be integrally formed with a portion of the gear box 152 (e.g., a housing of the gearbox 152), a portion of the housing 134 and/or any other suitable surface of the actuator 102. For example, at least a portion 153 of the gearbox 152 (e.g., adjacent the drive gear 160) may be made of a flexible material such as a rubber material or any other suitable material that provides a biasing force when deflected. In such a configuration, the biasing element 186 is not required.

Figure 1B:
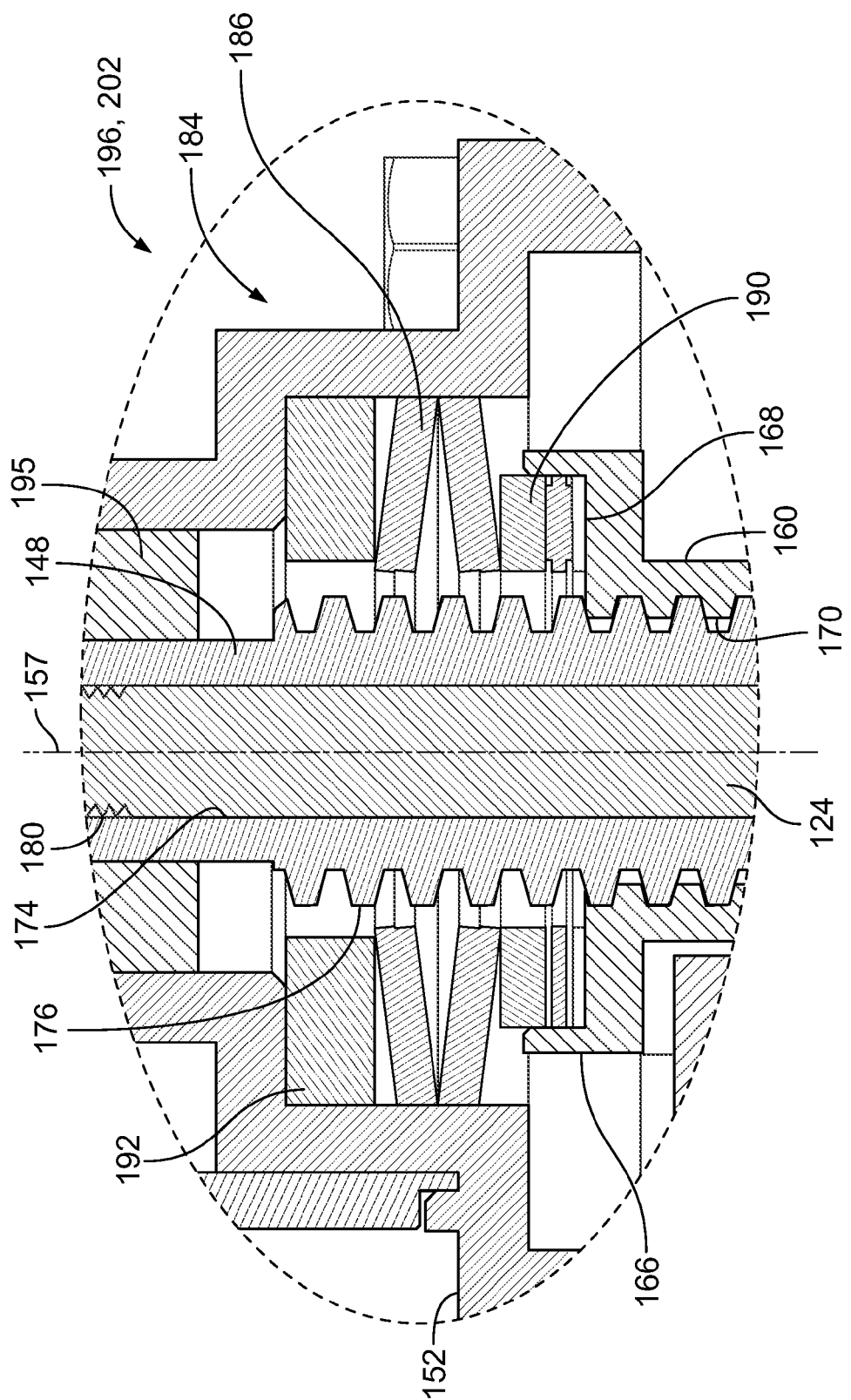
FIG. 1B illustrates an enlarged portion of the example actuator of FIG. 1A.
Figure 2:
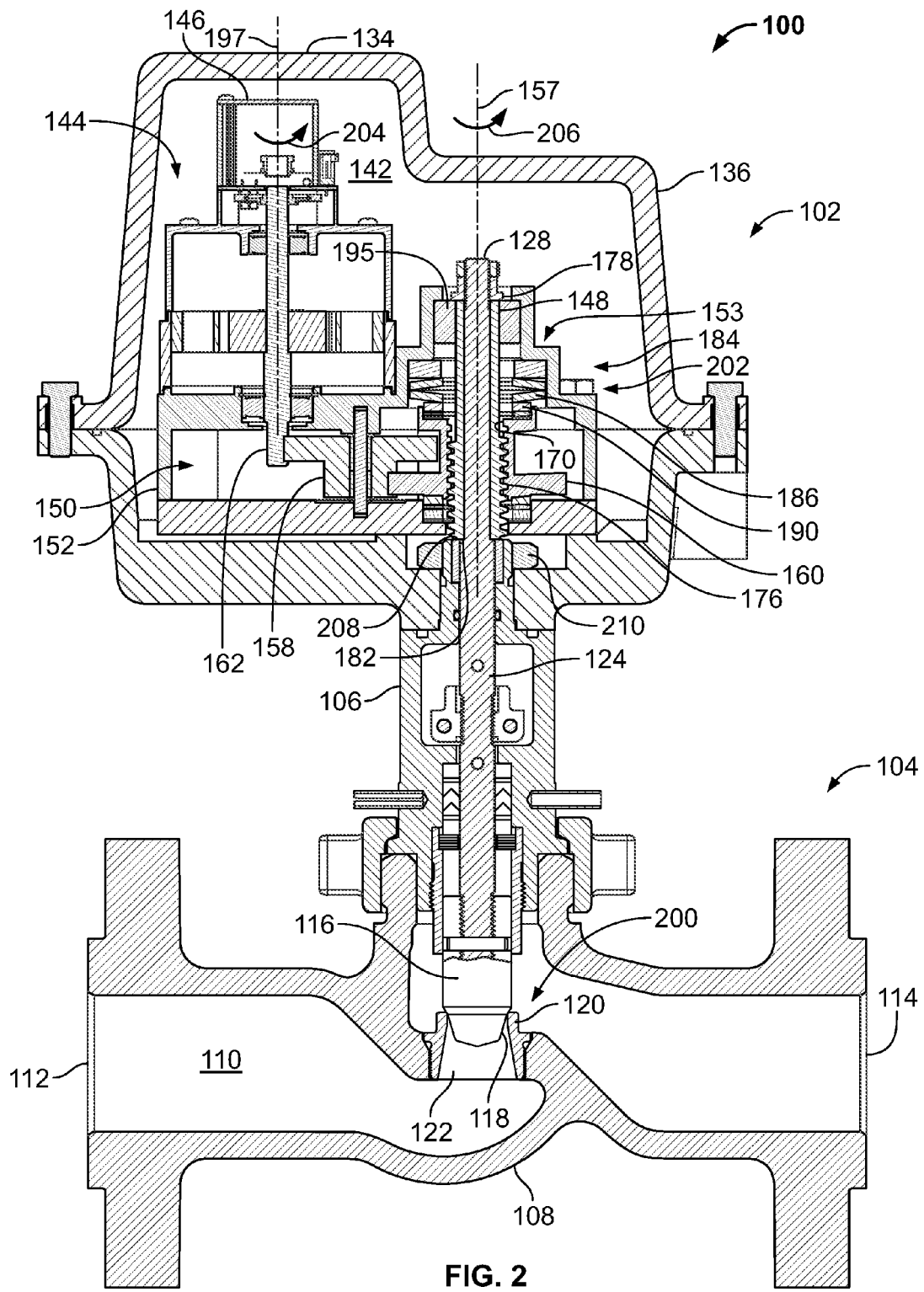
FIG. 2 illustrates the example control valve assembly of FIG. 1A, but shown in a closed position, at which a biasing element has not yet been deflected.
Figure 3A:
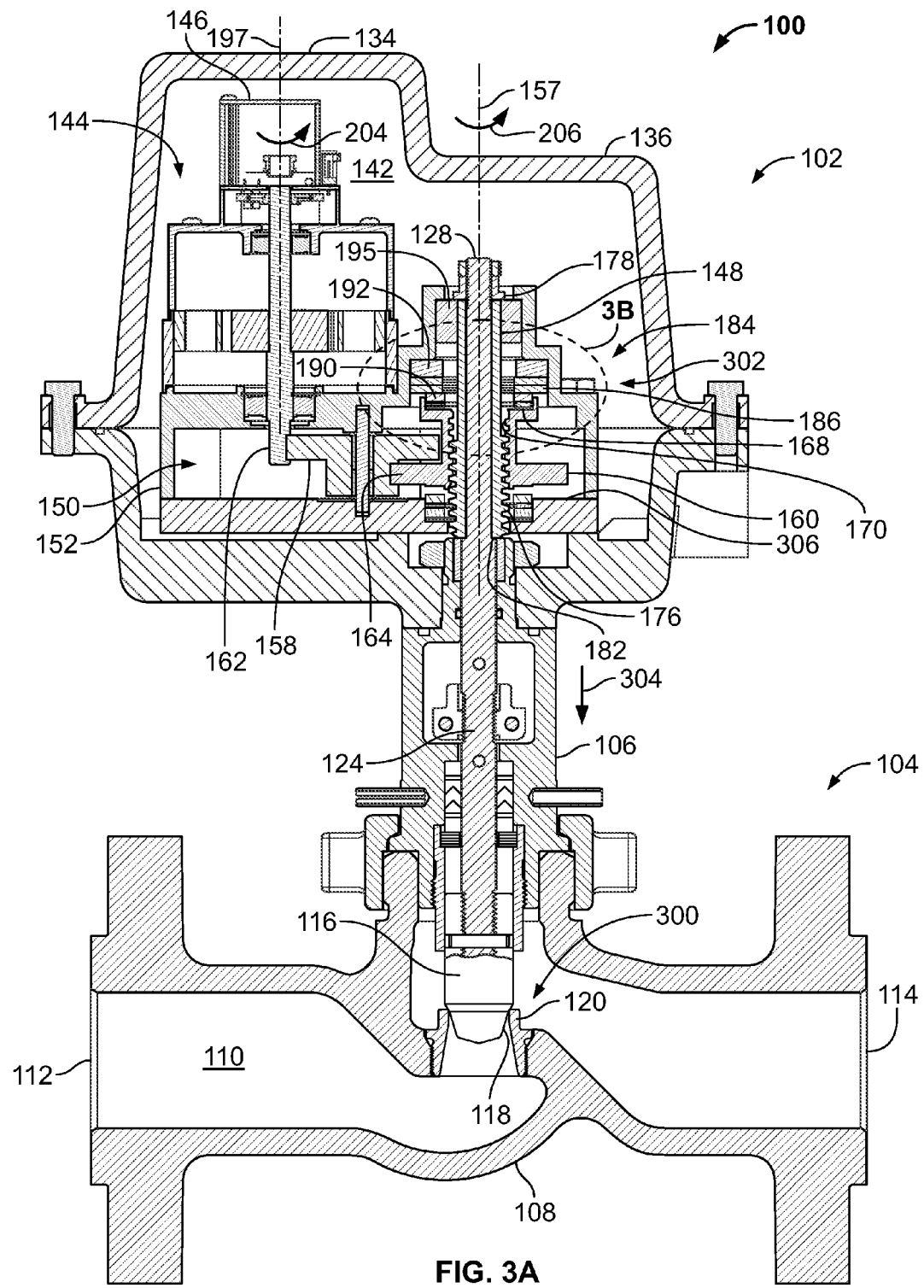
FIG. 3A illustrates the example control valve assembly of FIGS. 1 and 2 shown in a closed position at which the biasing element has been deflected.
Figure 3B:
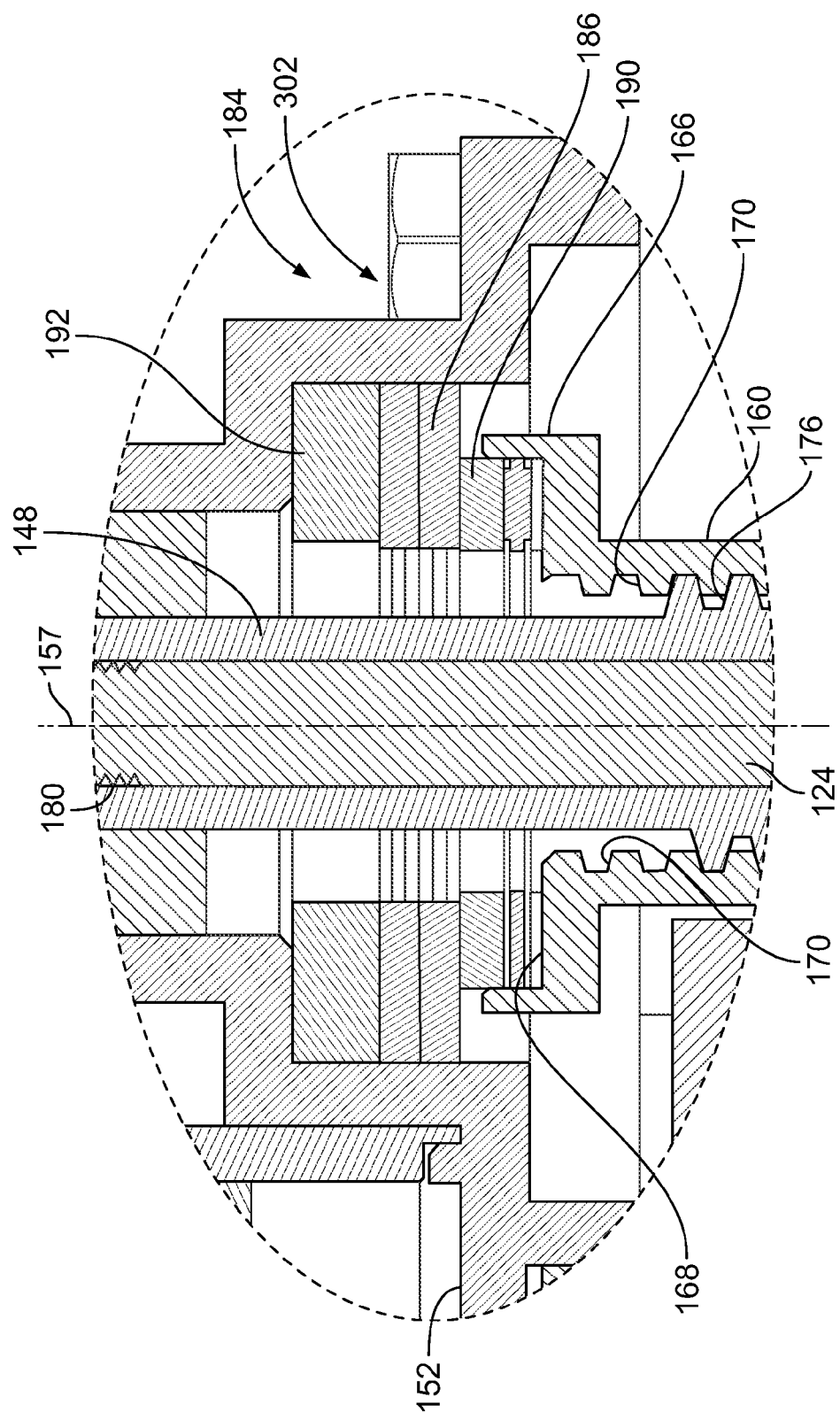
FIG. 3B illustrates an enlarged portion of the example actuator of FIG. 3A.

In FIG. 1A, the fluid valve 104 is depicted in an open position 194 and the biasing element 186 of the load apparatus 184 is in a first or a substantially non-deflected condition 196. FIG. 2 illustrates the fluid valve in a closed position 200, but showing the biasing element 186 of the load apparatus 184 in a substantially non-deflected condition 202. FIG. 3A illustrates the fluid valve 104 in a closed position 300 and shows the biasing element 186 in a substantially deflected condition 302 to provide a seat load 304 to the flow control member 116. FIGS. 1B and 3B illustrate enlarged portions of the load apparatus 184 showing the biasing elements 186 in the substantially non-deflected condition 194 and the substantially deflected condition 302, respectively.

Referring to FIGS. 1A, 1B, 2, 3A and 3B, in operation, the electric actuator 102 is activated to move the flow control member 116 between the open position 194 of FIG. 1A and the closed position 300 of FIG. 3A. The motor 146 drives or rotates the output shaft 162 in a first direction 199 (e.g., a clockwise direction) about an axis 197 to move the fluid valve 104 toward the open position 194 as shown in FIG. 1A and a second direction 204 (e.g., a counterclockwise direction) opposite the first direction 199 about the axis 197 to move the fluid valve 104 toward the closed positions 200 and 300 as shown in FIGS. 2 and 3A.

To move the fluid valve 104 toward the open position 194, electric power is provided to the motor 146 to rotate the output shaft 162 in the first direction 199 (FIG. 1A). The transmission 150 causes the drive gear 160 to rotate in a first direction 198 (e.g., a clockwise direction) about the axis 157. Rotation of the drive gear 160 in the first direction 198 causes the drive shaft 148 to move in a rectilinear motion along the axis 157 in a direction away from the fluid valve 104. More specifically, as the output shaft 162 rotates in the first direction 199, the intermediate gear 158 rotates the drive gear 160. In turn, the drive gear 160 rotates about the threaded portion 176 of the drive shaft 148 and causes the drive shaft 148 to move rectilinearly in a direction along the axis 157 because the intermediate gear 158 and/or the biasing element 186 help retain or hold the axial position of the drive gear 160 relative to the axis 157. Additionally, although not shown, a bushing 195 is coupled to the gearbox 152 (e.g., disposed within a housing of the gearbox 152 via press-fit) having at least one flat (not shown) that engages the drive shaft 148 to prevent the drive shaft 148 from rotating or spinning as the drive gear 160 rotates, thereby causing the drive shaft 148 to move rectilinearly via the threaded portion 176 as the drive gear 160 rotates about the threaded portion 176. Because the valve stem 124 is fixedly coupled to the drive shaft 148 via the flanged nut 178, the drive shaft 148 causes the valve stem 124 and, thus, the flow control member 116 to move away from the valve seat 120 to allow or increase fluid flow through the fluid flow pathway 110 between the inlet 112 and the outlet 114. As most clearly shown in FIG. 1B, when the fluid valve 104 is in the open position 194, the biasing element 186 is in the substantially non-deflected condition 196.

To move the fluid valve 104 toward the closed position 200 as shown in FIG. 2, electrical power is provided to the motor 146 to cause the output shaft 162 to rotate in the second direction 204 (e.g., a counterclockwise direction) about the axis 197. Rotation of the output shaft 162 in the second direction 204 causes the drive shaft 148 to move rectilinearly along the axis 157 in a direction toward the valve body 108. More specifically, as the output shaft 162 rotates in the second direction 204, the intermediate gear 158 rotates the drive gear 160 in a second direction 206 about the axis 157 and the threaded portion 176 of the drive shaft 148, causing the drive shaft 148 to move rectilinearly in a direction along the axis 157 toward the fluid valve 104. Rotation of the drive gear 160 in the second direction 206 about the axis 157 causes the drive shaft 148 and, thus, the flow control member 116 to move toward the valve seat 120 to prevent or restrict fluid flow through the fluid flow pathway 110 between the inlet 112 and the outlet 114. The biasing element 186 is in the substantially non-deflected condition 202 as the drive shaft 148 moves toward the fluid valve 104. Additionally, although the biasing element 186 is in the substantially non-deflected 202, a biasing force (e.g., a pre-stress force) provided by the biasing element 186 helps retain the axial position of the drive gear 160 relative to the intermediate gear 158 and the axis 157.

When the fluid valve 104 is in the closed position 200, the seating surface 118 of the fluid flow control member 116 sealingly engages the valve seat 120 to prevent fluid flow through the valve 102. When the fluid flow control member 116 is in engagement with the valve seat 120, the drive shaft 202 is prevented from moving further toward the valve seat 120 because the drive shaft 124 is rigidly coupled to the valve stem 124. However, the motor 146 continues to drive the drive gear 160 via the intermediate gear 158 causing the drive gear 160 to rotate about the threaded portion 176 of the drive shaft 148 while the drive shaft 148 is substantially axially stationary relative to the axis 157. In other words, the drive shaft 148 is at an end of stroke position when the flow control member 116 is sealingly engaged with the valve seat 120. As a result, the drive gear 160 moves or translates axially in a rectilinear direction toward the upper casing 136 of the housing 134 because the drive shall 148 is prevented from moving (e.g., in a rectilinear motion and/or a rotational motion) toward the valve seat 120 when the flow control member 116 is sealingly engaged with the valve seat 120. However, in other examples, the end of stroke position or end of travel may occur when a surface 208 of the drive shaft 148 engages a portion or surface 210 of the housing 134, the bonnet 106, or any other surface.

As the drive gear 160 rotates in the second direction 206 about the drive shaft 148 when the valve is in the closed position 200, the drive gear 160 moves or shifts axially along the axis 157 toward the upper casing 136 relative to the intermediate gear 158. However, the engaging portion 164 of the drive gear 160 does not disengage from the intermediate gear 158. In other words, the gear teeth of the engaging portion 164 remain engaged with the gear teeth of the intermediate gear 158 when the drive gear 160 translates axially along the axis 157.

As most clearly shown in FIG. 3B, the drive gear 160 shifts relative to the intermediate gear 158 in a rectilinear direction toward the upper casing 136 to cause the biasing element 186 to deflect or compress to the substantially deflected condition 302. In the deflected condition 302, the biasing element 186 exerts or provides a force against the drive gear 148. This force is transferred to the to the flow control member 116 via the thrust bearing 190. In particular, the thrust bearing 190 transmits the force exerted by the biasing element 186 to the flow control member 116 and allows the drive gear 160 to rotate freely about to the axis 157. Thus, the drive gear 160 moves axially along the axis 157 from the position 200 shown in FIG. 2 to the position 300 shown in FIG. 3A to deflect or compress the biasing element 186 when the fluid valve 104 is in the closed position 200 and the motor 146 continues to rotate the drive gear 160 in the second direction 206 about the axis 157.

When in the closed position 200 as shown in FIG. 2, the motor 146 provides a seat load to the fluid flow control member 116 when electric power is provided to the motor 146. However, when electric power is removed from the motor 146, the flow control member 116 may lack adequate or sufficient seat load to sealingly engage the valve seat 120 when, for example, the fluid valve 104 is in the closed position 200 of FIG. 2. Although a backdrive resistance of the motor 146 and/or the transmission 150 maintains the position or prevents rectilinear motion of the drive shaft 148 and, thus, the flow control member 116, the backdrive resistance of the motor 146 and/or the transmission 150 may not be adequate to maintain or provide a seat load to the flow control member 116 when electric power is removed from the motor 146. An adequate or sufficient seat load prevents fluid leakage through the orifice 122 when the flow control member 116 is sealingly engaged with the valve seat 120. In other words, an adequate or sufficient seat load maintains the fluid flow control member 116 in sealing engagement the valve seat 120 to substantially prevent fluid flow through the passageway 110 of the fluid valve 104. Absent such a seat load, fluid may leak past the orifice 122 even when the sealing surface 118 of the fluid flow control member 116 engages the valve seat 120.

When the load apparatus 184 is in the position 302 shown in FIGS. 3A and 3B, the load apparatus 184 provides the mechanical seat load 304 to maintain or keep the fluid flow control member 116 in sealing engagement with the valve seat 120 if electric power is removed from the motor 146 while the flow control member 116 is sealingly engaged with the valve seat 120. For example, it may be necessary to keep or retain the fluid valve 104 in the closed position 300 to prevent a spill (e.g., a chemical spill) during emergency situations, power failures, or if the electric power supply to the electric actuator 102 (e.g., the motor 146) is removed or shut down. Otherwise, failing to provide an adequate or sufficient seat load to the fluid flow control member 116 during, for example, a power outage may cause fluid flow to pass through the orifice 122 of the fluid valve 104 between the inlet 112 and the outlet 114. For example, the pressure of the pressurized fluid at the inlet 112 may provide a force against the fluid flow control member 116 (e.g., in a direction toward the bonnet 106 in the orientation of FIG. 2) to cause the sealing surface 118 of the fluid flow control member 116 to move away from the valve seat 120 and allow fluid to flow or leak toward the outlet 114 when electric power to the motor 146 is removed.

Thus, the example load apparatus 184 provides the seat load 304 to the fluid flow control member 116 to prevent fluid flow through the pathway 110 when the fluid valve 104 is in the closed position 300 and electric power is removed from the electric actuator 102. In particular, the load apparatus 184 provides the seat load 304 for an indefinite period of time. Further, the load apparatus 184 provides a seat load (e.g., the seat load 304) without consumption of electric power (i.e., with substantially zero electric power consumption). Thus, in some examples, when the fluid valve 104 is in the closed position 300, electric power to the motor 146 may be removed to conserve energy, thereby improving the performance and/or the efficiency of the electric actuator 102.

Additionally, the example electric actuator 102 reduces manufacturing costs and simplifies maintenance of the control valve assembly 100 because the load apparatus 184 does not require a clutching mechanism, a complex combination of biasing elements and/or brake systems to provide a seat load when the electric power to the electric actuator 102 is removed.

The example load apparatus 184 is not limited to the configuration illustrated in FIGS. 1A, 1B, 2, 3A and 3B. In some examples, the drive gear 160 and/or the biasing element 186 may be configured to provide a seat load in a direction opposite to the direction of the seat load 304 provided in the example shown in FIG. 3A. The load apparatus 184 and/or the drive gear 160 may be used with a fluid valve having a fluid control member and a valve seat in a configuration opposite that shown in FIG. 1 (e.g., a push-to-open fluid valve). For example, the orientation of the drive gear 160 and/or the load apparatus 184 may be reversed or opposite that shown such that the biasing element 186 is disposed between a surface 306 of the gearbox 152 and the drive gear 160. The drive gear 160 may be configured to translate axially along the axis 157 toward the valve body 108 to compress the biasing element 186 when a flow control member sealingly engages a valve seat of a push-to-open valve and the motor 146 continues to rotate the drive gear 160. In other examples, the surface 306 and/or a portion of the lower casing 138 may be made of a flexible material (e.g., a rubber material), or a flexible material may protrude from the surface 306 and/or the lower casing 138 to provide a biasing force when deflected or engaged by the drive gear 160. In this manner, the biasing element 186 is not required.

Figure 4A:
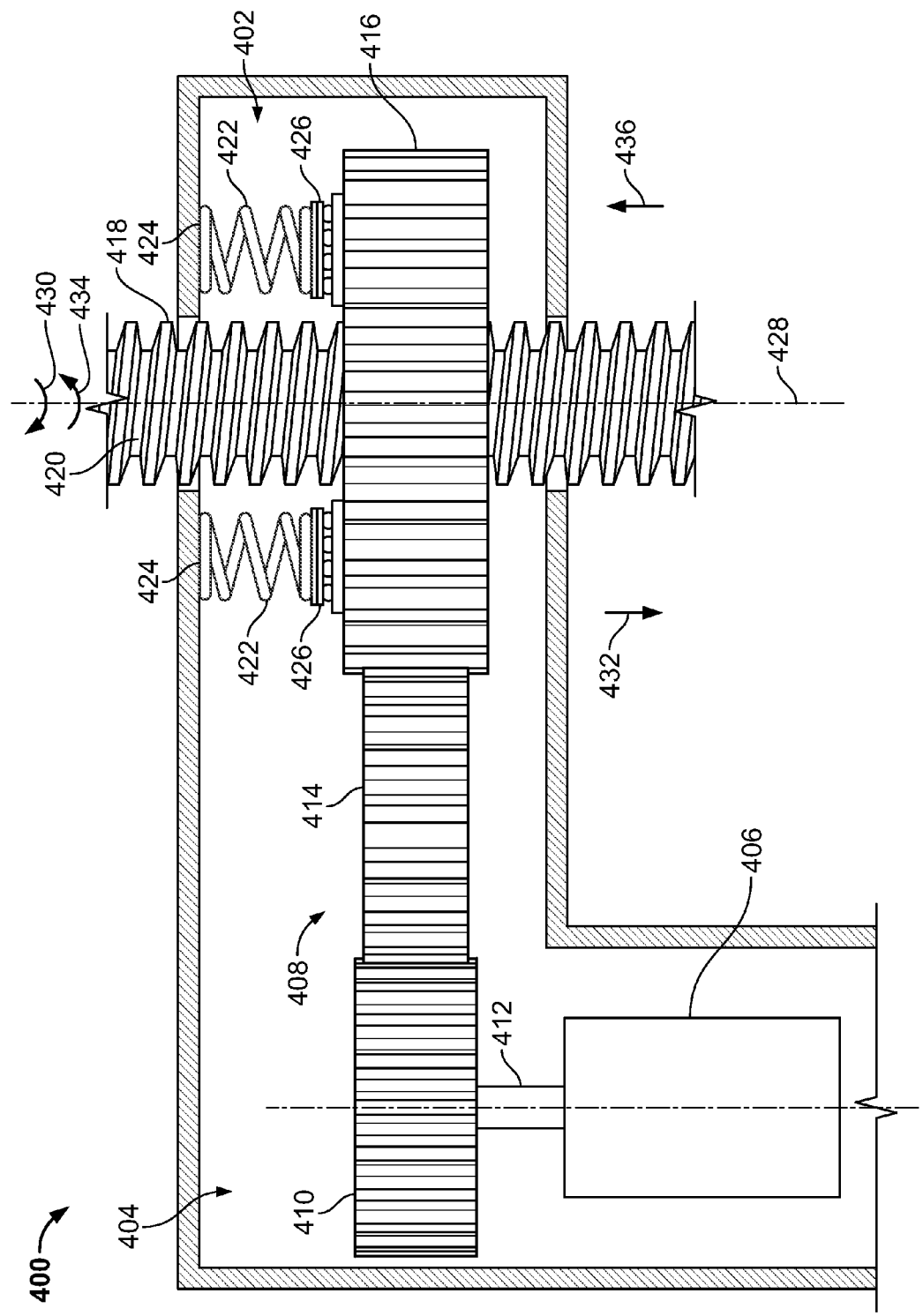
FIGS. 4A and 4B illustrate an enlarged portion of another example actuator described herein shown in a first position and a second position, respectively.
Figure 4B:
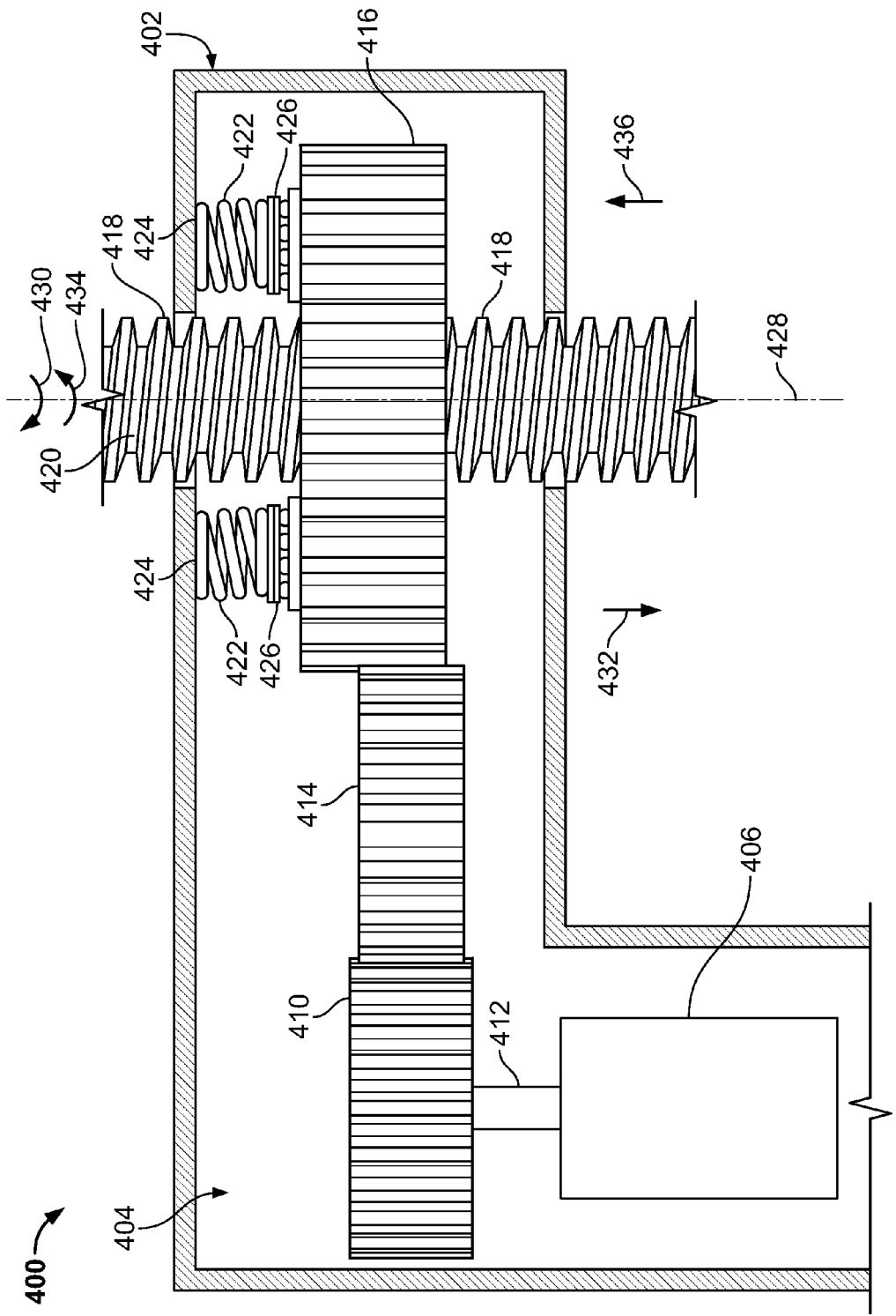

FIGS. 4A and 4B illustrate an enlarged portion of another example electric actuator 400 having a load apparatus 402 described herein. In this example, a drive system 404 includes a motor 406, a transmission 408, and the load apparatus 402. The transmission 408 includes a first gear 410 coupled to an output shaft 412 of the motor 406 and engages an intermediate gear 414. The intermediate gear 414 couples the first gear 410 and, thus, the motor 406 to a drive gear 416. The drive gear 416 includes a threaded aperture (not shown) to threadably receive a threaded portion 418 of a drive shaft 420. The load apparatus 402 includes biasing elements 422 depicted as springs that are disposed between a spring seat or surface 424 and the drive gear 416. Thrust bearings 426 are disposed between the biasing elements 422 and the drive gear 416, which can rotate freely about an axis 428. Additionally, the thrust bearings 426 transmit the spring force provided by the biasing elements 422 to the drive shaft 420 when the biasing elements 422 are deflected as shown in FIG. 4B.

In operation, the drive gear 416 rotates about the threaded portion 418 of the drive shaft 420 to cause the drive shaft 420 to move in a rectilinear motion along the axis 428. Rotation of the drive gear 416 in a first direction 430 causes the drive shaft 420 to move in a first rectilinear direction 432 and rotation of the drive gear 416 in a second direction 434 causes the drive shaft 420 to move in a second rectilinear direction 436. When the drive shaft 420 reaches an end of stroke (e.g., an end of travel point), the drive gear 416 can no longer move the drive shaft 420 rectilinearly along the axis 428 in the first direction 432. However, the drive gear 416 may continue to rotate in the first direction 430 about the threaded portion 418 of the drive shaft 420. As a result, the drive gear 416 moves or shifts axially along the axis 428 relative to the intermediate gear 414 to compress the biasing elements 422 as shown in FIG. 4B when the drive shaft 418 reaches an end of stroke and the drive gear 416 continues to rotate about the drive shaft 420 in the first direction 430. Thus, in addition to being able to rotate about the axis 428, the drive gear 416 can also translate axially along the axis 428 when the drive shaft 420 reached an end of stroke and the motor 406 continues to drive or rotate the drive gear 416 in the first direction 430 about the axis 428.

Figure 5A:
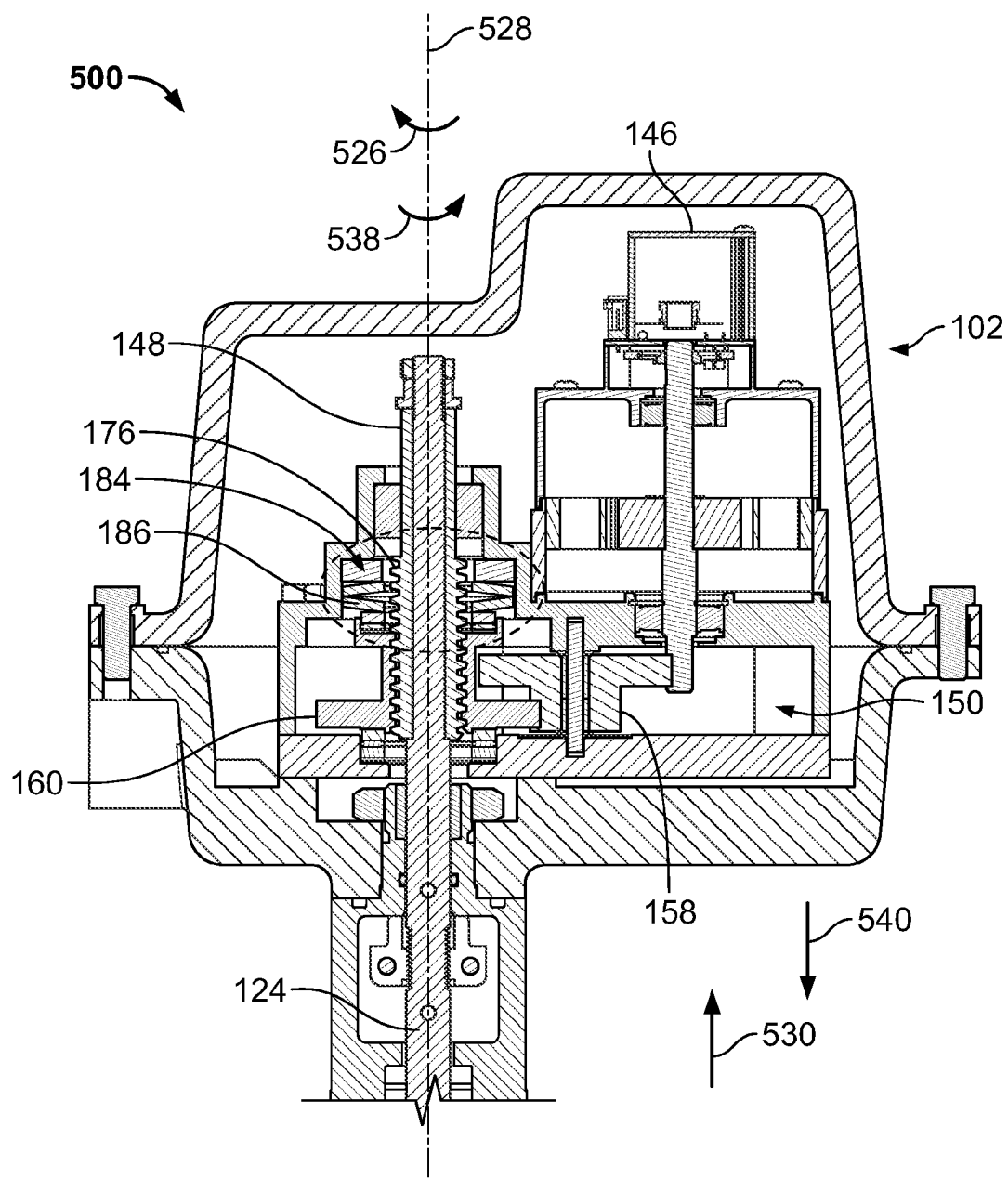

The example electric actuator 102 of FIGS. 1A, 1B, 2, 3A and 3B can be used with other fluid valves or any other device. For example, FIGS. 5A-5C illustrate an example control valve assembly 500 having the example electric actuator 102 of FIGS. 1A, 1B, 2, 3A, and 3B coupled to a rotary valve 502. The rotary valve 502 includes a valve body 504 having a disk or flow control member 506 interposed in a fluid flow path 508 between an inlet 510 and an outlet 512. The flow control member 506 is rotatably coupled relative to the valve body 504 via a valve shaft 514. A portion 516 (e.g., a splined end) of the valve shaft 514 extends from the rotary valve 502 and is received by a lever 518. In turn, the lever 518 operatively couples the drive shaft 148 of the electric actuator 102 and the flow control member 506. A rod end bearing 520 is coupled (e.g., threadably coupled) to the first end 126 (FIG. 1A) of the valve stem 124 and is coupled to a lever arm 522 of the lever 518 via a fastener 524 to operatively couple the lever 518 and the drive shaft 148. The lever 518 converts a rectilinear displacement of the drive shaft 148 into a rotational displacement of the valve shaft 514.

In operation, when the motor 146 rotates the drive gear 160 in a first direction 526 (e.g., a clockwise direction) about an axis 528, the drive gear 160 rotates about the threaded portion 176 of the drive shaft 148 to move the drive shaft 148 in a first rectilinear direction 530. When the drive shaft 148 moves in the first rectilinear direction 530, the drive shaft 148 causes the lever 518 to rotate in a first direction 532 about an axis 534. Rotation of the valve shaft 514 in the first direction 532 about the axis 534 causes the flow control member 506 to rotate away from a sealing surface 536 (e.g., an open position) to allow fluid flow through the valve body 504 between the inlet 510 and the outlet 512.

When the motor 146 rotates the drive gear 160 in a second direction 538 about the axis 528, the drive gear 160 rotates about the threaded portion 176 of the drive shaft 148 to move the drive shaft 148 in a second rectilinear direction 540. When the drive shaft 148 moves in the second rectilinear direction 540, the drive shaft 148 causes the lever 514 to rotate in a second direction 542 about the axis 534. Rotation of the valve shaft 514 in the second direction 542 about the axis 534 causes the flow control member 506 to rotate toward the sealing surface 536 (e.g., a closed position) to prevent or restrict fluid flow through the valve body 504 between the inlet 510 and the outlet 512. When in the closed position, the motor 146 continues to rotate the drive gear 160 in the second direction 538. However, the drive shaft 148 reaches an end of stroke position when the flow control member 506 sealingly engages the sealing surface 536. As a result, the drive gear 160 continues to rotate in the second direction 538 relative to the drive shaft 148 (i.e., a stationary drive shaft 148) and moves axially toward the biasing element 186 along the axis 528 relative to the intermediate gear 158 to compress or deflect the biasing element 186 of the load apparatus 184.

Although the backdrive resistance of the transmission 150 and/or the motor 146 prevents the lever 518 from rotating in the first direction 532 about the axis 534 when electric power to the motor 146 is removed, the backdrive resistance of the transmission 150 and/or motor 146 may not provide an adequate or sufficient seat load to prevent leakage of fluid through the pathway 508 when the rotary valve 502 is in the closed position. For example, the pressure of the fluid at the inlet 510 may cause a fluid leak between the flow control member 506 and the sealing surface 536 if an insufficient seat load is provided to the flow control member 506. However, when the biasing element 186 is in the deflected or compressed condition, the biasing element 186 exerts a force to provide an adequate or sufficient mechanical seat load to maintain or keep the fluid flow control member 506 in sealing engagement with the sealing surface 536 when electric power is removed from the motor 146 and the flow control member 506 is sealingly engaged with the sealing surface 536. In other words, for example, the biasing element 186, when deflected or compressed, provides a force that substantially restricts or prevents a relatively high pressure fluid at the inlet 510 from leaking between the flow control member 506 and the sealing surface 536 and through the pathway 508 when the fluid flow control member 506 sealingly engages the sealing surface 536 and electric power to the motor 146 is removed.

Although certain example apparatus have been described herein, the scope of coverage of this patent is not limited thereto. On the contrary, this patent covers all apparatus and articles of manufacture fairly falling within the scope of the appended claims either literally or under the doctrine of equivalents.

What is claimed is:

1. An electric actuator having an internal load apparatus comprising:
   a drive system having a drive gear that includes a threaded aperture;
   a drive shaft operatively coupled to the drive system, the drive shaft defines a body having a threaded portion and a longitudinal opening extending through an entire length of the drive shaft between a first end of the drive shaft and a second end of the drive shaft, the threaded portion to threadably engage the threaded aperture of the drive gear, wherein rotation of the drive system in a first rotational direction causes the drive shaft to move in a first rectilinear direction and rotation of the drive system in a second rotational direction causes the drive shaft to move in a second rectilinear direction opposite the first rectilinear direction;
   a valve stem slidably received through the longitudinal opening of the drive shaft; and
   a biasing element operatively coupled to the drive shaft, at least a portion of the drive system to move axially toward the biasing element to deflect the biasing element when the drive shaft reaches an end of stroke position to provide a load to the drive shaft when electric power to the electric actuator is removed.

2. An electric actuator as defined in claim 1, wherein the drive shaft is to be operatively coupled to a flow control member of a fluid valve.

3. An electric actuator as defined in claim 2, wherein the drive shaft reaches the end of stroke position when the fluid flow control member is in sealing engagement with a valve seat of the fluid valve.

4. An electric actuator as defined in claim 1, wherein the drive system comprises a motor operatively coupled to the drive gear via an intermediate gear disposed between an output shaft of the motor and the drive gear.

5. An electric actuator as defined in claim 4, wherein the drive gear moves axially relative to the intermediate gear when the drive system rotates the intermediate gear in the first rotational direction and the drive shaft is at the end of stroke position.

6. An electric actuator as defined in claim 4, wherein a thrust bearing is disposed between the drive gear and the biasing element.

7. An electric actuator as defined in claim 1, wherein the biasing element comprises a spring.

8. An electric actuator as defined in claim 1, wherein the biasing element is disposed within a housing of the drive system.

9. A load apparatus for use with an electric actuator comprising:
a drive gear operatively coupled to a drive system of the electric actuator, wherein the drive gear is to rotate in a first direction and a second direction, and wherein the drive gear is to move between a first rectilinear position and a second rectilinear position;
a drive shaft operatively coupled to the drive gear, the drive shaft comprises a body having an aperture and an externally threaded portion to threadably engage the drive gear, the drive gear to cause the drive shaft to move in a first rectilinear direction when the drive gear rotates in the first direction and the drive gear to cause the drive shaft to move in a second rectilinear direction when the drive gear rotates in the second direction;
a valve stem received by an aperture of the drive shaft, the drive shaft to move the valve stem between the first and second rectilinear positions;
a fastener having a flanged portion, the fastener to threadably couple to a first portion of the valve stem adjacent a first end of the drive shaft to retain the drive shaft between the flanged portion and a shoulder of the valve stem adjacent a second end of the drive shaft; and
a biasing element disposed between the drive gear and a seating surface such that when the drive gear rotates in the first direction and the drive shaft reaches an end of stroke position in the first rectilinear direction, the drive gear continues to rotate about the drive shaft in the first direction and moves axially relative to the drive shaft from the first rectilinear position to the second rectilinear position to deflect the biasing element.

10. A load apparatus of claim 9 wherein, when deflected, the biasing element is to apply a seat load to a fluid flow control member sealingly engaged with a valve seat of a fluid valve when electric power to the electric actuator is removed.

11. A load apparatus of claim 9, wherein the drive system comprises a motor and an intermediate gear to operatively couple the motor and the drive gear.

12. A load apparatus of claim 9, wherein the drive gear comprises a body having a threaded aperture along a longitudinal axis of the body to receive the drive shaft, the body having a first end and a second end opposite the first end, the first end having an engaging portion and the second end having a recessed opening to define a cavity and an annular wall, the recessed opening being coaxially aligned with a longitudinal axis of the threaded aperture.

13. A load apparatus of claim 12, further comprising a thrust bearing disposed between the biasing element and the drive gear, the thrust bearing being at least partially disposed within the cavity formed by the recessed opening of the drive gear.

14. A load apparatus for use with an electric actuator, comprising;
means for driving a valve stem between a first position and a second position, the means for driving having means for slidably receiving the valve stem, the means for slidably receiving to extend through an entire length of the means for driving between a first end of the means for driving and a second end of the means for driving;
first means for coupling a first end of the valve stem and the first end of the means for driving and second means for coupling a second end of the valve stem and the second end of the means for driving to prevent axial movement of the means for driving relative to the valve stem along a longitudinal axis of the valve stem;
means for converting rotational motion of a drive system to rectilinear motion of the means for driving, the means for converting rotational motion to engage a threaded portion of the means for driving;
means for providing a seat load to a fluid flow control member of a fluid valve coupled to the valve stem when the flow control member is in sealing engagement with a valve seat of the fluid valve and electric power to a motor is removed; and
means for deflecting the means for providing a seat load, the means for deflecting to move at least a portion of the means for converting rotational motion axially relative to the means for driving toward the means for providing a seat load.

15. A load apparatus as defined in claim 14, wherein rotation of the means for converting in a first rotational direction causes the means for driving to move in a first rectilinear direction and rotation of the means for converting in a second rotational direction causes the means for driving to move in a second rectilinear direction.

16. A load apparatus as defined in claim 15, wherein the means for providing a seat load comprises a means for biasing disposed between a spring seat and the means for converting.

17. A load apparatus as defined in claim 16, wherein the means for deflecting is to rotate the means for converting in the first rotational direction when the means for driving reaches an end of stroke position to cause the means for converting to move rectilinearly toward the means for biasing relative to the means for driving to deflect the means for biasing.

18. An electric actuator as defined in claim 1, wherein the valve stem is coupled to the first end of the drive shaft and the valve stem includes a shoulder to be positioned adjacent the end of the drive shaft.

19. An electric actuator as defined in claim 18, further comprising a fastener to capture or retain the drive shaft between the shoulder of the valve stem and the fastener to prevent axial movement of the valve stem relative to the drive shaft along a longitudinal axis of the longitudinal opening.

20. An electric actuator having an internal load apparatus-comprising:
a drive system having a drive gear that includes a threaded aperture
a drive shaft operatively coupled to the drive system, the drive shaft defines a body having a threaded portion and a longitudinal opening, the threaded portion to threadably engage the threaded aperture of the drive gear, wherein rotation of the drive system in a first rotational direction causes the drive shaft to move in a first rectilinear direction and rotation of the drive system in a second rotational direction causes the drive shaft to move in a second rectilinear direction opposite the first rectilinear direction;
a valve stem slidably received through the longitudinal opening of the drive shaft, the valve stem coupled to a first end of the drive shaft and the valve stem includes a shoulder to be positioned adjacent an second end of the drive shaft;
a biasing element operatively coupled to the drive shaft, at least a portion of the drive system to move axially toward the biasing element to deflect the biasing element when the drive shaft reaches an end of stroke position to provide a load to the drive shaft when electric power to the electric actuator is removed; and a fastener to capture or retain the drive shaft between the shoulder of the valve stem and the fastener to prevent axial movement of the valve stem relative to the drive shaft along a longitudinal axis of the longitudinal opening, wherein the fastener includes a nut having a flanged portion, the nut to threadably couple to the valve stem such that the flanged portion is to engage the first end of the drive shaft to capture or retain the drive shaft between the flanged portion and the shoulder of the valve stem.

21. An electric actuator as defined in claim 1, wherein the drive gear comprises a recessed cavity adjacent an end of the drive gear to receive at least a portion of the biasing element or a thrust bearing adjacent the biasing element.

22. A load apparatus of claim 13, wherein the cavity defines a diameter that is greater than a diameter of the threaded aperture.

23. An electric actuator as defined in claim 19, wherein the fastener comprises a nut having a flanged portion, the nut threadably coupled to the valve stem such that the flanged portion retains the drive shaft between the flange and the shoulder of the valve stem.

24. A load apparatus of claim 9, wherein the first portion of the valve stem extends past the first end of the drive shaft and a second portion of the valve stem extends past the second end of the drive shaft.

* * * * *